United States Patent [19]

Kim

[11] 4,375,664
[45] Mar. 1, 1983

[54] APPARATUS FOR DETECTING, CORRECTING AND LOGGING SINGLE BIT MEMORY READ ERRORS USING SYNDROME GENERATING AND DECODING CIRCUITRY

[75] Inventor: Dongsung R. Kim, Laguna Hills, Calif.

[73] Assignee: Burroughs Corporation, Detroit, Mich.

[21] Appl. No.: 165,884

[22] Filed: Jul. 3, 1980

Related U.S. Application Data

[63] Continuation-in-part of Ser. No. 156,113, Jun. 3, 1980.

[51] Int. Cl.³ .......................................... G06F 11/10
[52] U.S. Cl. ..................................... 364/200; 371/38
[58] Field of Search ........................... 371/13, 37, 38; 364/200 MS File, 900 MS File

[56] References Cited

U.S. PATENT DOCUMENTS 4,174,537  11/1979  Chu et al. ............................. 364/200
4,255,808  3/1981  Schaber ................................. 371/38

Primary Examiner—Harvey E. Springborn
Attorney, Agent, or Firm—Nathan Cass; Kevin R. Peterson; David G. Rasmussen

[57] ABSTRACT

Apparatus which detects and corrects both transient and single bit memory read errors while selectively logging only solid (that is, hardware-related) single bit memory read errors. Each of a plurality of memory modules directly transmits uncorrected memory data to a processor memory control while also providing for automatic local restoring of corrected data back into the memory address which produced the single bit error. The processor memory control provides its own error detection and correction employing syndrome generating and decoding circuitry which detects both multiple and single bit errors. Multiple bit errors are not corrected, but merely brought to the attention of the processor. Single bit errors are corrected, but only those which are found to most likely be solid errors are logged. A solid single bit error is recognized by detecting when two single bit errors having the same memory address occur consecutively.

8 Claims, 5 Drawing Figures

APPARATUS FOR DETECTING, CORRECTING AND LOGGING SINGLE BIT MEMORY READ ERRORS USING SYNDROME GENERATING AND DECODING CIRCUITRY

This application is a continuation-in-part of patent application Ser. No. 156,113, filed June 3, 1980.

INTRODUCTION

The present invention relates to improved apparatus for use in detecting, correcting and logging errors occurring in a digital data processing system. More particularly, the present invention relates to improved apparatus for detecting, correcting and selectively logging data errors occurring during memory accessing operations using syndrome generating and decoding circuitry.

BACKGROUND OF THE INVENTION

In recent years increasing attention has been given to apparatus for detecting, correcting and logging errors occurring during digital data processing operations. In providing such capabilities, it is important to provide appropriate balances between the advantages to be gained therefrom and the cost, complexity and performance impact resulting from the additional hardware, firmware, and/or software required. Accordingly, it becomes of considerable importance to choose an implementation for detecting, correcting and logging errors which permits appropriate advantage to be derived therefrom without unduly impacting on system cost, complexity or performance.

SUMMARY OF THE PRESENT INVENTION

Accordingly, it is a broad object of the present invention to provide improved apparatus for use in detecting, correcting and/or logging errors occurring in a data processing system.

A more specific object of the invention is to provide an improved approach and implementation employing syndrome generating and decoding circuitry for use in detecting, correcting and selectively logging particular types of errors occurring during memory accessing operations.

A further object of the invention in accordance with the foregoing object is to provide a simplified implementation for use with a memory which provides an unexpectedly advantageous error diagnosis and logging capability for use in expeditiously handling single bit errors occurring during memory read operations.

In a particular preferred embodiment of the invention, a relatively simple error detecting, correcting and logging implementation is provided employing syndrome generating and decoding circuitry for use in conjunction with one or more integrated circuit data processor memories. In order to efficiently make use of this simple implementation, it is constructed and arranged in accordance with the invention to take advantage of what experience and theoretical considerations indicate are the error occurrence patterns and resulting operational effects most likely to be expected from the memory. Accordingly, for reasons which will be explained hereinafter, the preferred implementation is primarily directed to detecting and correcting single bit memory read errors, while providing for logging the address and error syndrome pattern of only solid single bit memory read errors which are defined as those single bit errors which can not be corrected by either retrying or by restoring the correct word back into the memory and then retrying. Other types of single bit errors, such as transient errors are corrected, but not logged. The preferred implementation can thus be remarkably simpler than would otherwise be possible.

Further advantages are derived from the preferred embodiment by providing for the correction of single bit memory read errors at each memory module as well as in the memory control of the data processor. One advantage of such an arrangement is that each memory module is able to provide for restoring corrected values for all single bit errors back into its memory independently of the processor memory control and without burden thereto. Another advantage is that the processor memory control is able to directly receive uncorrected memory data and to independently provide for the detection and correction of all single bit errors as well as being able to provide for the detection and logging of solid single bit memory read errors without having to be concerned with the logging of other types of errors. Furthermore, the processor memory control does not have to wait for a memory module to provide error detection and correction data, nor does it have to provide for restoring a corrected word into the memory module which provided the data. Thus, the processor memory control may break off from a memory module as soon as it receives the uncorrected data therefrom, just as if none of these error related capabilities were being provided.

The specific nature of the invention as well as other objects, features, advantages, uses and possible variations thereof will become apparent from the following description of a preferred embodiment along with the accompanying drawings.

DESCRIPTION OF A PREFERRED EMBODIMENT

Like numerals and characters refer to like elements throughout the figures of the drawings.

For the preferred embodiment in which an integrated circuit memory is employed, the most common type of error which may be expected to occur is a single bit memory read error. Accordingly, to maintain simplicity, the preferred implementation of the present invention is primarily concerned with handling single bit memory read errors.

A single bit memory read error may be characterized as being either solid or transient. As pointed out previously, a solid single bit error is a single bit error in a word read out from memory having the characteristic that retrying the read operation or restoring the corrected word back into the memory and then retrying does not correct the error.

A transient single bit memory read error is one which can be corrected by retrying (one or more times), or by restoring and then retrying. A transient single bit memory read error which can be corrected by restoring and then retrying is usually referred to as an output error, while a transient single bit memory read error which requires restoring in order to obtain correction is usually referred to as a soft error.

It will be appreciated that transient errors are not easily diagnosed since they may not occur during diagnostic operations. Also, unlike a solid error, a transient error may not necessarily be the result of defective hardware but may be caused, for example, by noise or by alpha particles radiation. Also, because transient single bit errors may be expected to occur much more frequently than solid single bit errors, these transient errors would place a significant burden on an error logging implementation. In addition, attempts to log such transient errors could mask the more important solid single bit errors.

The preferred implementation of the present invention takes the above factors and characteristics into account in a manner which results in providing a remarkedly simple and advantageous implementation for detecting and correcting single bit memory read errors, and for logging solid single bit errors which are the important ones for hardware diagnosing purposes.

Figure 1:
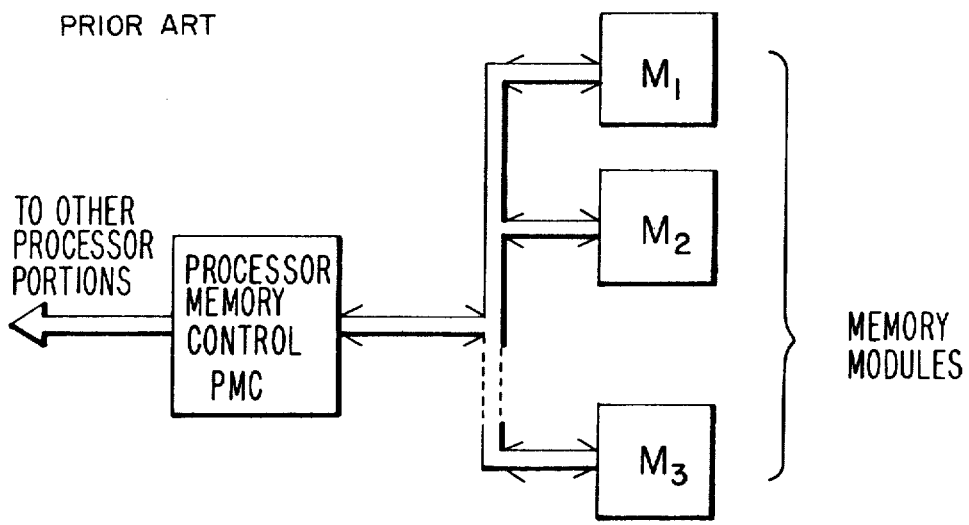
FIG. 1 is a block diagram generally illustrating a prior art processor memory control system in which the present invention may be incorporated.

Referring now to FIG. 1, illustrated therein is a conventional arrangement of a processor memory control PMC providing communication between a plurality of memory modules $M_1$-$M_n$ and other processor portions of one or more processors. Typically, the processor memory control PMC selectively provides read and write control signals to the memory modules $M_1$-$M_n$ along with read and write memory addresses and write data, while providing for receiving read data accessed from the memory modules $M_1$-$M_n$.

Figure 2:
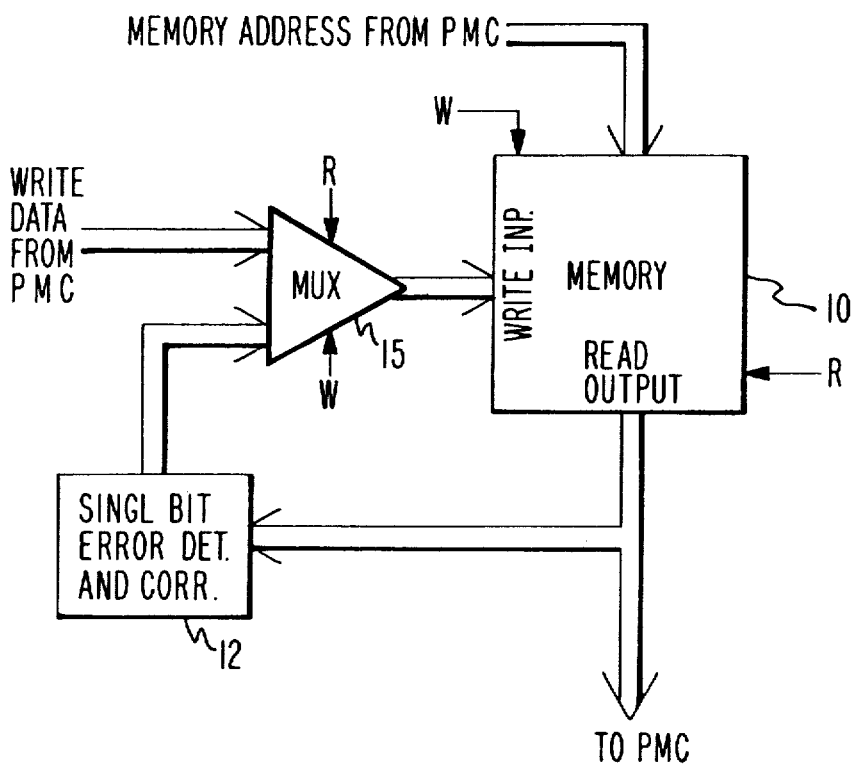
FIG. 2 is a block diagram illustrating how the preferred implementation is provided for each memory module in FIG. 1.

Reference is next directed to FIG. 2 which illustrates how the memory portion of the preferred implementation is locally provided for use in conjunction with the memory 10 of a typical memory module of FIG. 1. It will be understood that data is read out of memory 10 from a selected address in response to a read signal R and a memory address provided by the processor memory control PMC (FIG. 1). This data read out from memory 10 is sent to PMC in the usual manner, and, in addition, is locally applied to a single bit error detector and corrector 12 (which may be of conventional form). As is well known, data read out from a memory typically includes check bits which may be employed to detect and correct single bit errors occurring in data read from a storage device or memory. Further information with regard to error detection and correction devices can be found, for example, in the article by R. W. Hamming, "Error Detecting and Error Correcting Codes," Bell Systems Technical Journal, 29, 1950, pp. 147–160; in U.S. Pat. No. 4,168,486, J. E. Legory, inventor; in U.S. Pat. No. 4,052,698, H. U. Ragle, inventor; and in U.S. Pat. No. 4,174,537, Ke-Chiang Chu, et al, inventors.

The single-bit error detector and corrector 12 in FIG. 2 detects the occurrence of a single bit memory read error and automatically restores corrected data provided by the single bit error detector and corrector 12 back into the same memory address via a multiplexer 15. The multiplexer 15 preferably passes this corrected data to the write inputs of memory 10 in response to the current read signal R so as to automatically provide for restoration of corrected data whenever a single bit error is detected. The multiplexer 15 is also responsive to a write signal W provided by PMC (FIG. 1) so as to provide for writing data supplied by PMC into a selected memory address in the usual manner.

Figure 3:
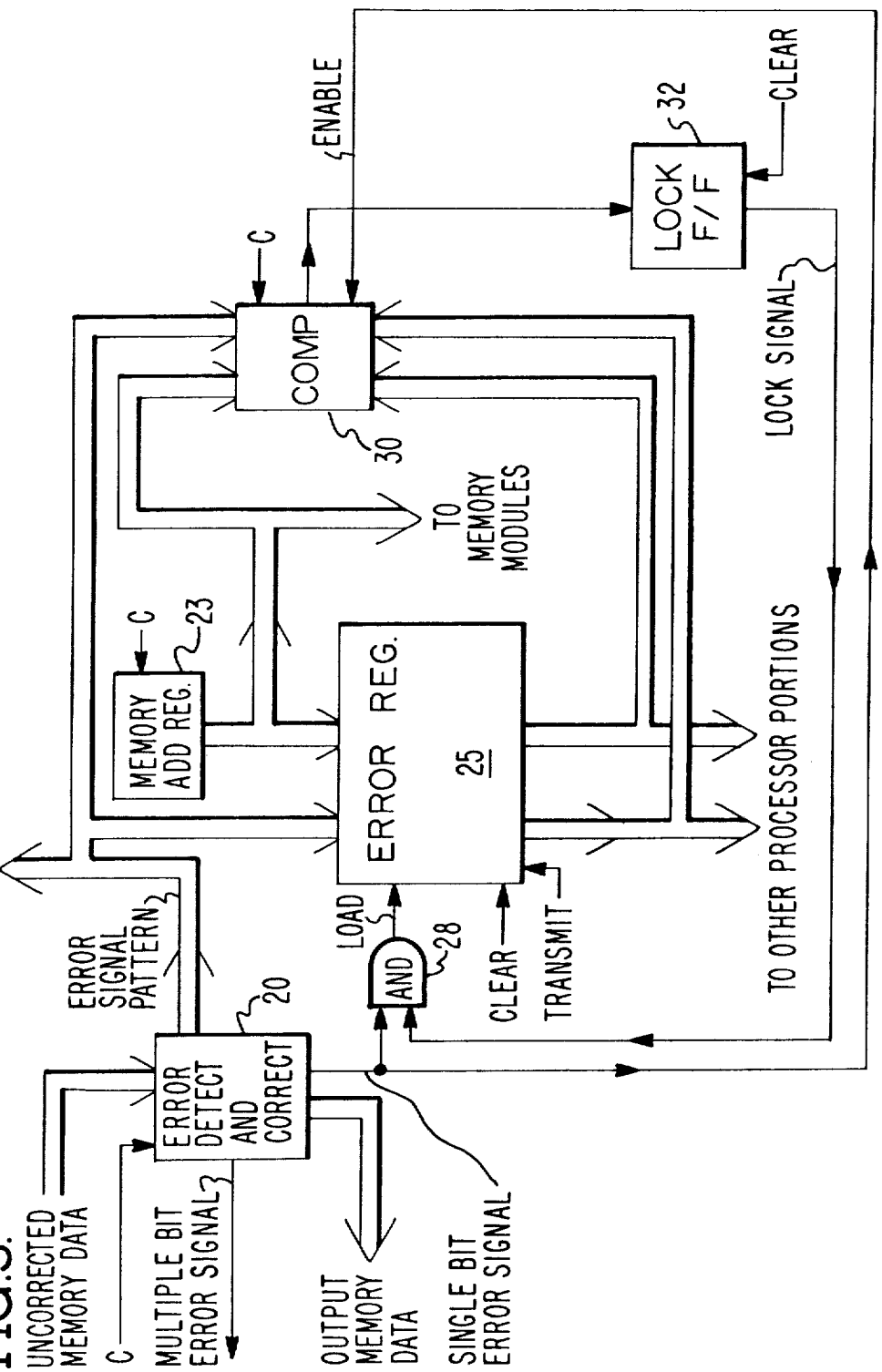
FIG. 3 is a block diagram illustrating how the preferred implementation is provided in the processor memory control of FIG. 1.

Referring next to FIG. 3, illustrated therein is the pertinent portion of the processor memory control PMC in FIG. 1 involved in the preferred implementation of the present invention.

It will be understood from FIG. 3 that the PMC portion shown includes its own error detector and corrector 20. Memory read data from a memory module of FIG. 2 is applied to error detector and corrector 20 which, in response thereto, operates in a conventional manner to provide the following four outputs:

(1) a single bit error signal indicating the presence of a single bit error in the applied memory data;

(2) a multiple bit error signal indicating the presence of a multiple error in the applied memory data;

(3) an error signal pattern (typically referred to as syndrome bits in the art) which indicates the type of error occurring and, if a single bit error, the particular bit of the applied memory data which is in error; and (4) output memory read data which is one of the following:
 (a) the applied memory read data if no error is detected or
 (b) the corrected memory read data if a single bit error is detected or
 (c) the uncorrected memory read data if a multiple error is detected.

Before continuing with the description of FIG. 3, it is to be noted that, since the preferred implementation is primarily concerned with single bit memory read errors, a multiple read memory error is preferably handled by merely feeding the multiple error signal along with the corresponding error signal pattern provided by the error detector and corrector 20 in FIG. 3 and the corresponding memory address contained in an address register 23 of FIG. 3 to the master control portion of the processor (not shown) for appropriate action such as, for example, halting processor operation or initiating an interrupt operation to handle the multiple error.

In the event of a single bit memory read error, the preferred implementation permits the processor to continue operations in the normal manner without interruption or halting of processor operations, as will become evident from the further description of FIG. 3 which now follows.

As shown, FIG. 3 includes (in addition to the error detector and corrector 20 and memory address register 23) an error register 25, an AND gate 28 for controlling the loading of the error register 25 with an error signal pattern (from error detector and corrector 20) and a corresponding memory address (from address register 23) each time a single bit error is detected, a comparator 30 for comparing a new signal error pattern and a corresponding memory address with those currently stored in the error register 25, and a lock flip-flop 32 which provides a lock signal that disenables AND gate 28 in response to the comparator 30 finding that a new error pattern and corresponding memory address are the same as these currently stored in the error register 25.

Having described the basic structure and arrangement of the memory module and PMC portions of the preferred implementation illustrated in FIGS. 2 and 3, respectively, the operation thereof will next be considered. In this regard, it is assumed for the preferred implementation that each addressable word stored in a memory module contains sufficient check bits to permit at least single bit and multiple bit error detection and at least single bit error correction.

Considering first the operation provided for multiple bit errors, it should now be understood that these are readily handled by both memory and PMC portions of the preferred implementation. This will become evident by noting that the memory portion of the preferred implementation shown in FIG. 2, in effect, ingores multiple bit memory read errors, since single bit error detector and corrector 12 provides for correcting and restoring only single bit memory read errors. This creates no problem or burden to the processor since uncorrected data read from a memory module is, in any event, sent directly to the processor memory control PMC (FIG. 2) just as if no correcting or restoring were taking place at the memory module.

Multiple bit memory read errors are also readily handled by the PMC portion of the preferred implementation shown in FIG. 3, since, as pointed out earlier herein, the error detector and corrector 20 does not attempt to correct or log a multiple bit memory read error, but merely provides a multiple bit error signal along with the uncorrected memory data and the corresponding memory address and error signal pattern address for transmission to the processor master control for appropriate action, such as interruption or halting of processor operations.

Having explained how multiple bit memory read errors are readily handled, it will next be explained how single bit memory read errors are advantageously handled by the preferred implementation without burdening normal processor operations. From the description so far, it should be evident that the memory module portion of the preferred implementation shown in FIG. 2 handles a single bit memory read error independently of the processor by locally correcting and restoring the memory data back into the memory address from which it was read, while independently of such local correcting and restoring operations, transmitting the uncorrected memory data to the processor memory control PMC (FIG. 1). As indicated in the preferred implementation portion illustrated in FIG. 3, the uncorrected memory data is applied to the error detector and corrector 20. If no error is present the error detector and corrector 20 merely outputs the input memory data without change for transmission to the processor portion which requires the memory data. If, on the other hand, a single bit memory read error is detected, the error detector and corrector 20 outputs corrected memory data for transmission to the required processor portions, the only delay being that required for detection and correction operations which can be economically designed to occur at high speed, since a single error detector and corrector can be shared by many memory modules.

The remaining portion of the preferred implementation illustrated in FIG. 3 is devoted to the selective logging of a particular type of single bit memory read error, namely, a solid single bit memory read error, which, as pointed out earlier herein, is of most importance with regard to diagnosing a hardware defect. It is to be understood that the operations involved in this selective logging of a solid single bit memory read error do not burden normal processor operations since they are able to be performed independently of other processor operations and concurrently therewith, as will become evident from the further description of FIG. 3 which will now be presented.

As indicated in FIG. 3, when a single bit memory read error is detected by the error detector and corrector 20 during a clock period, it provides a single bit error signal to one input of AND gate 28. The other input of AND gate 28 receives the lock signal provided by the lock flip-flop 32 which is initially true as a result of a clear signal initially applied to the lock flip-flop 32.

Accordingly, when during a clock period a single bit error signal is produced by the error detector and corrector 20 (as a result of detecting a single bit memory read error), a load signal is caused to be applied to the error register 25 during the same clock period along with the corresponding memory address (in memory address register 23) and the error signal pattern provided by the error detector and corrector 20. Also during the same clock period, an error signal pattern is applied to the comparator 30 for comparison with the data currently stored in the error register 25 (which is intially set to all zeros by the clear signal). Thus, in response to the next occurring clock signal, the error signal pattern produced in the previous clock period will be stored in the error register 25 along with the corresponding memory address, and the comparator 30 will not change the initial setting of the lock flip-flop 32, since this produced error pattern will not be the same as the initial all zeros setting of the error register 25. The AND gate 28 will thereby remain enabled.

When a single bit error signal is next produced by the error detector and corrector 20 during a clock period, the same operations as described above will again occur so long as the new error signal pattern and memory address are different from those stored in the error register 25 in response to the previously detected single bit error, thereby maintaining AND gate 28 enabled.

Assume now that a single bit memory read error is detected for which the error signal pattern produced by the error detector and corrector 20 and the corresponding memory address provided by the memory address register 23 are the same as those currently stored in the error register 25, which occurs when two consecutive single bit errors are obtained for the same memory address. In such a case, the comparator now produces an output to the lock flip-flop 32 which changes the lock signal from true to false, thereby disenabling AND gate 28 to prevent the error register 25 from being changed. A processor (not shown) may then respond to this false lock signal to provide a transmit signal to the error register 25 which causes the error signal pattern and memory address stored therein to be transmitted for logging in a suitable logging device 40 such as a memory or a display. A clear signal is then provided to permit logging operations to start over again.

It will be understood from the foregoing description of the logging operation of FIG. 3 that the particular single bit memory errors which are logged are those single bit memory read errors which are consecutively detected at the same memory address. In other words, if one or more single bit memory read errors for different memory addresses intervene between two detected single bit memory read errors corresponding to the same memory address, then there would be no logging, since the comparator 30 compares the signal pattern and corresponding memory address of each currently detected single bit memory read error with those obtained for the last occurring single bit memory error signal, since this is what is currently stored in the error register 25. It has been found that the use of such consecutively occurring single bit errors for logging purposes is an advantageously simple way of detecting and logging most solid single bit errors which, as pointed out previously, are of primary concern from a hardware diagnosis viewpoint. Thus, transient errors which are of less significance are conveniently ignored and which are in any event automatically corrected locally at each memory module, since it has been found to be most unlikely that two transient memory read errors for the same memory address will occur consecutively.

Further details will now be presented explaining how error detecting and correction is provided in the preferred implementation. For this purpose, it will be assumed that each addressable memory location of a memory module (FIG. 1) comprises a total of 22 cells for storing 16 data bits $D_0$–$D_{15}$ plus a 6-bit check code $D_{16}$–$D_{21}$. As is well known in the art, a 6-bit check code provides the capability of detecting and correcting all single bit errors and also detecting all double bit errors and certain multiple bit errors.

Figure 4:
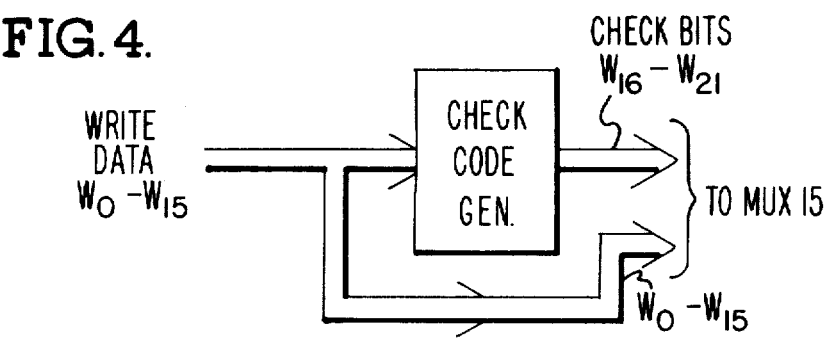
FIG. 4 is a block diagram illustrating the generation of check bits prior to writing into the memory module of FIG. 2.

The 6-bit check code may be generated in a conventional manner during each writing operation. More specifically, as illustrated in FIG. 4, the sixteen data bits $W_0$–$W_{15}$ which are to be written into a memory module location are applied to a check code generator 40 for generating six check code bits $W_{16}$–$W_{21}$ corresponding thereto. These check code bits $W_{16}$–$W_{21}$ are then applied to MUX 15 (FIG. 2) of the addressed memory module along with the data bits $W_0$–$W_{15}$ for writing of the resulting 22-bit word $W_0$–$W_{21}$ into the selected memory module location. The logical encoding functions provided by the check code generator 40 for generating the check code bits $W_{16}$–$W_{21}$ from the data bits $W_0$–$W_{15}$ are set forth below wherein a plus "+" in these equations represents a logical exclusive or function:

$$W_{16}=(W_0+W_1+W_2+W_3+W_4+W_5+W_6+W_7)'$$

$$W_{17}=(W_0+W_1+W_2+W_8+W_9+W_{10}+W_{11}+W_{12})'$$

$$W_{18}=(W_3+W_4+W_8+W_9+W_{10}+W_{13}+W_{14}+W_{15})'$$

$$W_{19}=(W_0+W_3+W_5+W_6+W_8+W_{11}+W_{13}+W_{14})'$$

$$W_{20}=(W_1+W_5+W_7+W_9+W_{11}+W_{12}+W_{13}+W_{15})'$$

$$W_{21}=(W_2+W_4+W_6+W_7+W_{10}+W_{12}+W_{14}+W_{15})'$$

Figure 5:
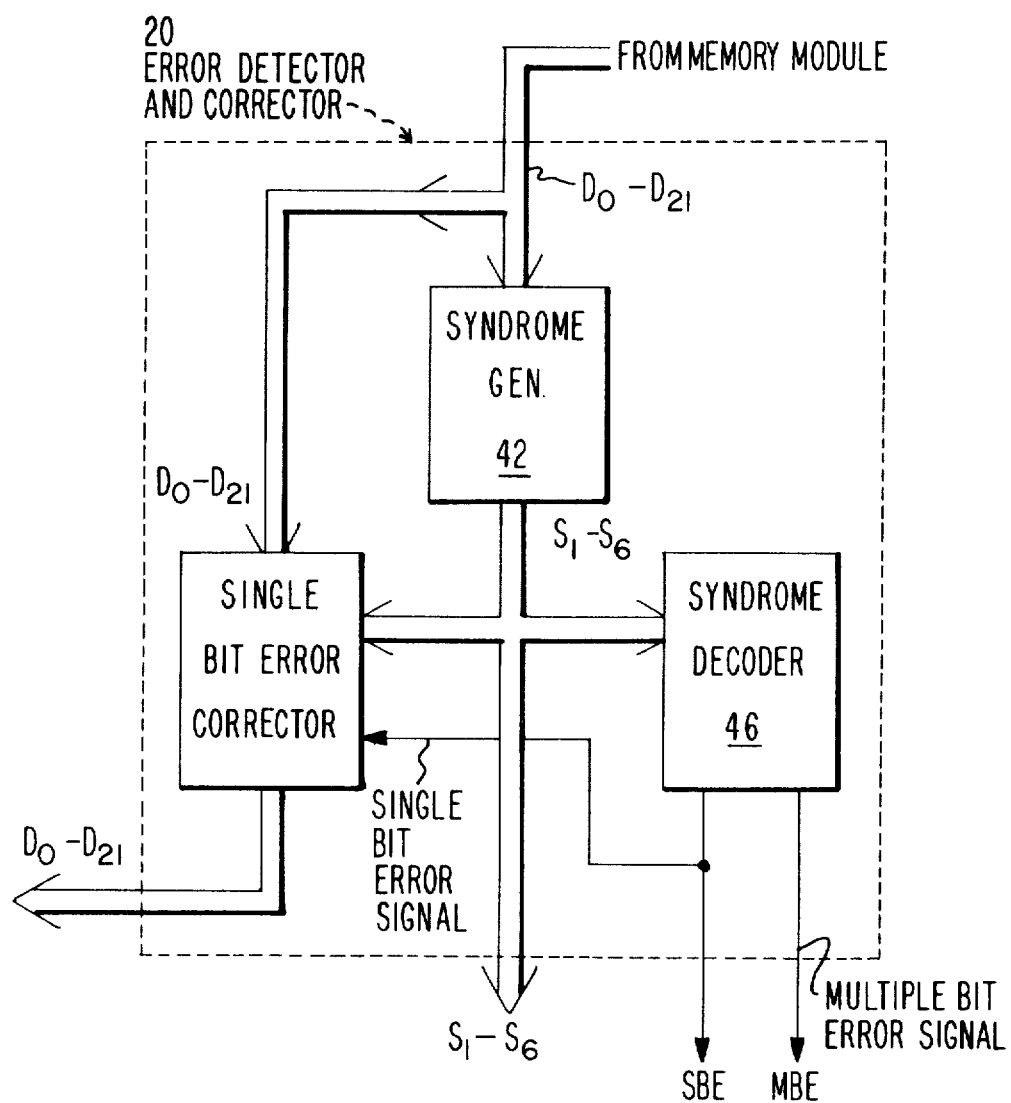
FIG. 5 is a block diagram illustrating a preferred implementation of the error detector and corrector shown in FIG. 3.

Next to be considered is the manner in which the provision of a 6-bit check code as described above is used during a reading operation. As will be understood from FIG. 5, a total of 22 bits $D_0$–$D_{21}$ (comprised of 16 data bits $D_0$–$D_{15}$ and six check code bits $D_{16}$–$D_{21}$) read from a selected memory module are applied to an error detector and corrector which for illustrative purposes will be assumed to be the error detector and corrector 20 of FIG. 3. As shown in FIG. 5, the error detector and corrector 20 comprises a syndrome generator 42, a single bit data error corrector 44 and a syndrome decoder 46.

As indicated in FIG. 5, all 22 bits $D_0$–$D_{21}$ read from a memory module during a read operation, including the 16 data bits $D_0$–$D_{15}$ as well as the six check code bits $D_{16}$–$D_{21}$, are applied to a syndrome generator 42. The syndrome generator 42 is constructed and arranged to logically combine the bits $D_0$–$D_{21}$ to produce six syndrome bits $S_1$–$S_6$ in accordance with the following logical relationships wherein a "+" represents a logical exclusive or function:

$$S_1=(D_0+D_1+D_2+D_3+D_4+D_5+D_6+D_7+D_{16})'$$

$$S_2=(D_0+D_1+D_2+D_8+D_9+D_{10}+D_{11}+D_{12}+D_{17})'$$

$$S_3=(D_3+D_4+D_8+D_9+D_{10}+D_{13}+D_{14}+D_{15}+D_{18})'$$

$$S_4=(D_0+D_3+D_5+D_6+D_8+D_{11}+D_{13}+D_{14}+D_{19})'$$

$$S_5=(D_1+D_5+D_7+D_9+D_{11}+D_{12}+D_{13}+D_{15}+D_{20})'$$

$$S_6=(D_2+D_4+D_6+D_7+D_{10}+D_{12}+D_{14}+D_{15}+D_{21})'$$

It will be understood that the logical functions performed by the check code generator 40 (FIG. 4) set forth previously and those set forth above for the syndrome generator 42 are readily implementable in various known ways by those skilled in the art. For example, the check code generator 40 may be implemented using Fairchild CTL 9822, CTL 9838 and CTL 9828 integrated circuits, while the syndrome generator 42 may be implemented using Fairchild CTL 9822 and CTL 9828 integrated circuits.

The interpretations of the 64 possible values which may result for the six syndrome bits $S_1$–$S_6$ produced at the output of the syndrome generator 42 in FIG. 5 are set forth in Table I below:

TABLE I

| \multicolumn{6}{c}{SYNDROME BITS} | |
|---|---|---|---|---|---|---|
| $S_1$ | $S_2$ | $S_3$ | $S_4$ | $S_5$ | $S_6$ | INTERPRETATION |
| 0 | 0 | 0 | 0 | 0 | 0 | No Error |
| 0 | 0 | 0 | 0 | 0 | 1 | Check Bit $D_{21}$ Error |
| 0 | 0 | 0 | 0 | 1 | 0 | Check Bit $D_{20}$ Error |
| 0 | 0 | 0 | 0 | 1 | 1 | Even Error |
| 0 | 0 | 0 | 1 | 0 | 0 | Check Bit $D_{19}$ Error |
| 0 | 0 | 0 | 1 | 0 | 1 | Even Error |
| 0 | 0 | 0 | 1 | 1 | 0 | Even Error |
| 0 | 0 | 0 | 1 | 1 | 1 | Multiple Odd Error |
| 0 | 0 | 1 | 0 | 0 | 0 | Check Bit $D_{18}$ Error |
| 0 | 0 | 1 | 0 | 0 | 1 | Even Error |
| 0 | 0 | 1 | 0 | 1 | 0 | Even Error |
| 0 | 0 | 1 | 0 | 1 | 1 | Data Bit $D_{15}$ Error |
| 0 | 0 | 1 | 1 | 0 | 0 | Even Error |
| 0 | 0 | 1 | 1 | 0 | 1 | Data Bit $D_{14}$ Error |
| 0 | 0 | 1 | 1 | 1 | 0 | Data Bit $D_{13}$ Error |
| 0 | 0 | 1 | 1 | 1 | 1 | Even Error |
| 0 | 1 | 0 | 0 | 0 | 0 | Check Bit $D_{17}$ Error |
| 0 | 1 | 0 | 0 | 0 | 1 | Even Error |
| 0 | 1 | 0 | 0 | 1 | 0 | Even Error |
| 0 | 1 | 0 | 0 | 1 | 1 | Data Bit $D_{12}$ Error |
| 0 | 1 | 0 | 1 | 0 | 0 | Ever Error |
| 0 | 1 | 0 | 1 | 0 | 1 | Multiple Odd Error |
| 0 | 1 | 0 | 1 | 1 | 0 | Data Bit $D_{11}$ Error |
| 0 | 1 | 0 | 1 | 1 | 1 | Even Error |
| 0 | 1 | 1 | 0 | 0 | 0 | Even Error |
| 0 | 1 | 1 | 0 | 0 | 1 | Data Bit $D_{10}$ Error |
| 0 | 1 | 1 | 0 | 1 | 0 | Data Bit $D_9$ Error |
| 0 | 1 | 1 | 0 | 1 | 1 | Even Error |

TABLE I-continued

| \multicolumn{6}{c|}{SYNDROME BITS} | |
|---|---|---|---|---|---|---|
| $S_1$ | $S_2$ | $S_3$ | $S_4$ | $S_5$ | $S_6$ | INTERPRETATION |
| 0 | 1 | 1 | 1 | 0 | 0 | Data Bit $D_8$ Error |
| 0 | 1 | 1 | 1 | 0 | 1 | Even Error |
| 0 | 1 | 1 | 1 | 1 | 0 | Even Error |
| 0 | 1 | 1 | 1 | 1 | 1 | Multiple Odd Error |
| 1 | 0 | 0 | 0 | 0 | 0 | Check Bit $D_{16}$ Error |
| 1 | 0 | 0 | 0 | 0 | 1 | Even Error |
| 1 | 0 | 0 | 0 | 1 | 0 | Even Error |
| 1 | 0 | 0 | 0 | 1 | 1 | Data Bit $D_7$ Error |
| 1 | 0 | 0 | 1 | 0 | 0 | Even Error |
| 1 | 0 | 0 | 1 | 0 | 1 | Data Bit $D_6$ Error |
| 1 | 0 | 0 | 1 | 1 | 0 | Data Bit $D_5$ Error |
| 1 | 0 | 0 | 1 | 1 | 1 | Even Error |
| 1 | 0 | 1 | 0 | 0 | 0 | Even Error |
| 1 | 0 | 1 | 0 | 0 | 1 | Data Bit $D_4$ Error |
| 1 | 0 | 1 | 0 | 1 | 0 | Multiple Odd Error |
| 1 | 0 | 1 | 0 | 1 | 1 | Even Error |
| 1 | 0 | 1 | 1 | 0 | 0 | Data Bit $D_3$ Error |
| 1 | 0 | 1 | 1 | 0 | 1 | Even Error |
| 1 | 0 | 1 | 1 | 1 | 0 | Even Error |
| 1 | 0 | 1 | 1 | 1 | 1 | Multiple Odd Error |
| 1 | 1 | 0 | 0 | 0 | 0 | Even Error |
| 1 | 1 | 0 | 0 | 0 | 1 | Data Bit $D_2$ Error |
| 1 | 1 | 0 | 0 | 1 | 0 | Data Bit $D_1$ Error |
| 1 | 1 | 0 | 0 | 1 | 1 | Even Error |
| 1 | 1 | 0 | 1 | 0 | 0 | Data Bit $D_0$ Error |
| 1 | 1 | 0 | 1 | 0 | 1 | Even Error |
| 1 | 1 | 0 | 1 | 1 | 0 | Even Error |
| 1 | 1 | 0 | 1 | 1 | 1 | Multiple Odd Error |
| 1 | 1 | 1 | 0 | 0 | 0 | Multiple Odd Error |
| 1 | 1 | 1 | 0 | 0 | 1 | Even Error |
| 1 | 1 | 1 | 0 | 1 | 0 | Even Error |
| 1 | 1 | 1 | 0 | 1 | 1 | Multiple Odd Error |
| 1 | 1 | 1 | 1 | 0 | 0 | Even Error |
| 1 | 1 | 1 | 1 | 0 | 1 | Multiple Odd Error |
| 1 | 1 | 1 | 1 | 1 | 0 | Multiple Odd Error |
| 1 | 1 | 1 | 1 | 1 | 1 | Even Error |

In order to correct single bit errors in bits $D_0=D_{21}$, the syndrome bits $S_1-S_6$ are applied to the single bit data error corrector 44 along with bits $D_0-D_{21}$ as shown in FIG. 5. It will be apparent from the above Table I that the particular syndrome patterns representing single bit errors are as follows:

| | \multicolumn{6}{c|}{Single Bit Error Patterns} | | | | | |
|---|---|---|---|---|---|---|
| Bit | $S_1$ | $S_2$ | $S_3$ | $S_4$ | $S_5$ | $S_6$ |
| $D_0$ | 1 | 1 | 0 | 1 | 0 | 0 |
| $D_1$ | 1 | 1 | 0 | 0 | 1 | 0 |
| $D_2$ | 1 | 1 | 0 | 0 | 0 | 1 |
| $D_3$ | 1 | 0 | 1 | 1 | 0 | 0 |
| $D_4$ | 1 | 0 | 1 | 0 | 0 | 1 |
| $D_5$ | 1 | 0 | 0 | 1 | 1 | 0 |
| $D_6$ | 1 | 0 | 0 | 1 | 0 | 1 |
| $D_7$ | 1 | 0 | 0 | 0 | 1 | 1 |
| $D_8$ | 0 | 1 | 1 | 1 | 0 | 0 |
| $D_9$ | 0 | 1 | 1 | 0 | 1 | 0 |
| $D_{10}$ | 0 | 1 | 1 | 0 | 0 | 1 |
| $D_{11}$ | 0 | 1 | 0 | 1 | 1 | 0 |
| $D_{12}$ | 0 | 1 | 0 | 0 | 1 | 1 |
| $D_{13}$ | 0 | 0 | 1 | 1 | 1 | 0 |
| $D_{14}$ | 0 | 0 | 1 | 1 | 0 | 1 |
| $D_{15}$ | 0 | 0 | 1 | 0 | 1 | 1 |
| $D_{16}$ | 1 | 0 | 0 | 0 | 0 | 0 |
| $D_{17}$ | 0 | 1 | 0 | 0 | 0 | 0 |
| $D_{18}$ | 0 | 0 | 1 | 0 | 0 | 0 |
| $D_{19}$ | 0 | 0 | 0 | 1 | 0 | 0 |
| $D_{20}$ | 0 | 0 | 0 | 0 | 1 | 0 |
| $D_{21}$ | 0 | 0 | 0 | 0 | 0 | 1 |

Accordingly, the single bit error corrector 44 in FIG. 5 operates in response to the above single bit syndrome patterns and to a "1" or true single bit error signal SBE from the syndrome decoder 46 to invert the particular bit which is in error and thereby provide corrected bits $D_0-D_{21}$ at its output. If no such single bit error is present ($S_1S_2S_3S_4S_5S_6=000000$ in Table I), or if other than a single bit error is indicated (see Table I), then the single bit error signal SBE from the syndrome decoder 46 will be "0" or false and will cause the single bit error corrector 44 to output bits $D_0-D_{21}$ unchanged. For example, if bit $D_0$ is read during a read operation as a "1" and the syndrome generator provides a single bit syndrome error pattern of $S_1S_2S_3S_4S_5S_6=110100$ indicating $D_0$ is in error, the single bit error corrector 44 will then operate in response to this syndrome error pattern to invert $D_0$ and thereby provide a correct "0" value for $D_0$ at the output of the error corrector 44.

From the foregoing, it will be evident that the logical functions performed by the data error corrector 44 in FIG. 5 may be represented by the following equations, wherein the single bit error corrector outputs are indicated as $(D_0)$, $(D_1)$, etc.; and wherein a "+" represents a logical "or" function:

$$(D_0) = J_0 D_0' + J_0' D_0; \quad J_0 = S_1 S_2 S_3' S_4 S_5' S_6'$$

$$(D_1) = J_1 D_1' + J_1' D_1; \quad J_1 = S_1 S_2 S_3' S_4' S_5 S_6'$$

$$(D_2) = J_2 D_2' + J_2' D_2; \quad J_2 = S_1 S_2 S_3' S_4' S_5' S_6$$

$$(D_3) = J_3 D_3' + J_3' D_3; \quad J_3 = S_1 S_2' S_3 S_4 S_5' S_6'$$

$$(D_4) = J_4 D_4' + J_4' D_4; \quad J_4 = S_1 S_2' S_3 S_4' S_5' S_6$$

$$(D_5) = J_5 D_5' + J_5' D_5; \quad J_5 = S_1 S_2' S_3' S_4 S_5 S_6'$$

$$(D_6) = J_6 D_6' + J_6' D_6; \quad J_6 = S_1 S_2' S_3' S_4 S_5' S_6$$

$$(D_7) = J_7 D_7' + J_7' D_7; \quad J_7 = S_1 S_2' S_3' S_4' S_5 S_6$$

$$(D_8) = J_8 D_8' + J_8' D_8; \quad J_8 = S_1' S_2 S_3 S_4 S_5' S_6'$$

$$(D_9) = J_9 D_9' + J_9' D_9; \quad J_9 = S_1' S_2 S_3 S_4' S_5 S_6'$$

$$(D_{10}) = J_{10} D_{10}' + J_{10}' D_{10}; \quad J_{10} = S_1' S_2 S_3 S_4' S_5' S_6$$

$$(D_{11}) = J_{11} D_{11}' + J_{11}' D_{11}; \quad J_{11} = S_1' S_2 S_3' S_4 S_5 S_6'$$

$$(D_{12}) = J_{12} D_{12}' + J_{12}' D_{12}; \quad J_{12} = S_1' S_2 S_3' S_4' S_5 S_6$$

$$(D_{13}) = J_{13} D_{13}' + J_{13}' D_{13}; \quad J_{13} = S_1' S_2' S_3 S_4 S_5 S_6'$$

$$(D_{14}) = J_{14} D_{14}' + J_{14}' D_{14}; \quad J_{14} = S_1' S_2' S_3 S_4 S_5' S_6$$

$$(D_{15}) = J_{15} D_{15}' + J_{15}' D_{15}; \quad J_{15} = S_1' S_2' S_3 S_4' S_5 S_6$$

$$(D_{16}) = J_{16} D_{16}' + J_{16}' D_{16}; \quad J_{16} = S_1 S_2' S_3' S_4' S_5' S_6'$$

$$(D_{17}) = J_{17} D_{17}' + J_{17}' D_{17}; \quad J_{17} = S_1' S_2 S_3' S_4' S_5' S_6'$$

$$(D_{18}) = J_{18} D_{18}' + J_{18}' D_{18}; \quad J_{18} = S_1' S_2' S_3 S_4' S_5' S_6'$$

$$(D_{19}) = J_{19} D_{19}' + J_{19}' D_{19}; \quad J_{19} = S_1' S_2' S_3' S_4 S_5' S_6'$$

$$(D_{20}) = J_{20} D_{20}' + J_{20}' D_{20}; \quad J_{20} = S_1' S_2' S_3' S_4' S_5 S_6'$$

$$(D_{21}) = J_{21} D_{21}' + J_{21}' D_{21}; \quad J_{21} = S_1' S_2' S_3' S_4' S_5' S_6$$

It will be understood that the above described operation of the error corrector 44 of FIG. 5 may be implemented in various known ways by those skilled in the art. For example, such operation may be implemented using Fairchild CTL 9822 and CTL 9839 integrated circuits.

The syndrome bits $S_1S_2S_3S_4S_5S_6$ produced by the syndrome generator 42 in FIG. 5 are also applied to the syndrome decoder 46 which in response thereto produces the single bit error signal SBE and the multiple bit error signal MBE. As pointed out previously, the single bit error signal SBE is applied to the single bit error corrector 44 for the purpose of determining whether the input bits $D_0$–$D_{21}$ are to be corrected or to be outputted unchanged. As also explained previously, the multiple bit error signal MBE is applied along with the unchanged bits $D_0$–$D_{19}$ to the processor master control for appropriate action. It will be evident from Table I and the previously presented equations for the single bit error corrector 44 that the logical functions performed by the syndrome decoder 46 in generating the single bit error signal SBE and the multiple bit error signal MBE are as follows, wherein a "+" represents a logical "or" function:

$$SBE = J_0 + J_1 + J_2 \ldots J_{21}$$

$$MBE = K_0 + K_1 + K_2 \ldots K_{40}$$

wherein the terms $J_0$–$J_{21}$ respectively correspond to the states of $S_1S_2S_3S_4S_5S_6$ for the twenty-two single bit error syndrome patterns contained in Table I, and wherein the terms $K_0$–$K_{40}$ respectively correspond to the states of $S_1S_2S_3S_4S_5S_6$ for the forty-one multiple bit error syndrome patterns contained in Table I. In this regard, it will be noted that the states of $S_1S_2S_3S_4S_5S_6$ for $J_0, J_1, J_2 \ldots J_{21}$ have previously been set forth in the equations presented for the single bit error corrector 44. For example, FIG. 6 illustrates a circuit arrangement of AND gates 50 and 53 and OR gates 55 and 58 for implementing the above equations for the syndrome decoder 46. Although the appropriate logical combinations of the syndrome bits $S_1S_2S_3S_4S_5S_6$ have been illustrated in FIG. 6 only for $J_0, J_{21}, K_0$ and $K_{40}$, it will be understood that the appropriate combinations for the remaining terms may readily be obtained from Table I.

It is to be understood that the present invention is subject to many modifications and variations in construction, arrangement and use without departing from the true scope of the invention. The present invention is accordingly to be considered as including all possible modifications and variations encompassed by the appended claims.

What is claimed is:

1. In a data processing system, the combination comprising:

selectively addressable storage means including a plurality of memories;

addressing means for selectively writing into and reading out data from a selected one of said memories;

means for providing a plurality of check bits along with data written into each memory location of said selected memory, said check bits being chosen so as to permit detecting and correcting of all single bit memory read errors appearing in memory data read from any location of said selected memory;

local error detection and correction means, one for each said memory, for detecting and correcting said single bit memory read errors in data read from its respective memory and for automatically restoring corrected data back into the respective memory location whenever a single bit memory read error is detected;

common error detection and correction means to which data read from each memory is applied without correction by its respective local error detection and correction means; said common error detection and correction means including:

a syndrome generation means responsive to said applied memory data for generating a syndrome signal pattern indicating whether a single bit error is present in the applied memory data and if so the particular bit in error;

syndrome decoding means responsive to said syndrome bit signal pattern for producing a single bit error signal indicating the presence of a single bit error; and single bit error correction means responsive to said syndrome pattern and said single bit error signal for correcting a single bit error occurring in said applied memory data; and selective error determining means operative in response to said single bit error signal, said addressing means, and said syndrome pattern for indicating when a detected single bit error in data read from a memory is likely to be hardware related by determining whether this same error has been consecutively detected a predetermined plurality of times for the same memory location.

2. The invention in accordance with claim 1, wherein said syndrome decoding means of said common error detection and correction means also includes means for producing a multiple bit error signal indicating the presence of a multiple bit error in data read from a selected memory location.

3. The invention in accordance with claim 1, wherein said selective error determining means includes:

error storing means operable in response to said single bit error signal for storing therein the syndrome pattern and memory address corresponding to the selected memory data which produced the single bit error signal; and control means for preventing any change in said error storing means whenever the same single bit error is consecutively detected for said selected memory data corresponding to the same memory address a predetermined number of times.

4. The invention in accordance with claim 3, wherein said error storing means includes an error register, wherein said control means includes a comparator for comparing a currently produced error syndrome pattern and corresponding memory address with those currently stored in said error register; and wherein said control means also includes locking means coupled to said comparator for preventing any change in said error register in response to said comparator determining that a currently produced error syndrome pattern and corresponding memory address are the same as those currently stored in said error register.

5. The invention in accordance with claim 4, including means for transmitting to a utilization device the syndrome pattern and corresponding memory address locked into said error register by said locking means.

6. The invention in accordance with claim 5, including means for clearing and unlocking said error register after transmission of the syndrome pattern and corresponding memory address locked therein.

7. The invention in accordance with claim 1, 2, 3, 4, 5 or 6, wherein said selective error determining means includes means for indicating the occurrence of a hardware related single bit memory read error based on determining whether a single bit memory read error has been consecutively detected a predetermined plurality of times for the same memory location without the intervening detection of a single bit memory read error at a different memory location of the respective memory.

8. The invention in accordance with claim 7, wherein said predetermined plurality of times is two.

* * * * *